United States Patent
Kuroda

(10) Patent No.: US 7,119,492 B2
(45) Date of Patent: Oct. 10, 2006

(54) FLICKER DETECTING SYSTEM FOR DETECTING LAMP LIFE DIFFERING FROM LAMP TO LAMP

(75) Inventor: Atushi Kuroda, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 11/039,595

(22) Filed: Jan. 19, 2005

(65) Prior Publication Data
US 2005/0156537 A1 Jul. 21, 2005

(30) Foreign Application Priority Data
Jan. 19, 2004 (JP) ............................. 2004-010489

(51) Int. Cl.
*H05B 37/04* (2006.01)
*H05B 37/02* (2006.01)

(52) U.S. Cl. ..................................... 315/134; 315/308

(58) Field of Classification Search ................ 315/129, 315/134, 291, 307, 308, 150; 250/216
See application file for complete search history.

(56) References Cited

U.S. PATENT DOCUMENTS

| | | | | |
|---|---|---|---|---|
| 5,598,000 A | * | 1/1997 | Popat | 250/206 |
| 5,905,529 A | * | 5/1999 | Inuiya et al. | 348/221.1 |
| 5,973,457 A | * | 10/1999 | Yamashita et al. | 315/225 |

FOREIGN PATENT DOCUMENTS

| | | |
|---|---|---|
| JP | 62-118284 | 7/1987 |
| JP | 63-212991 | 9/1988 |
| JP | 404037251 A * | 2/1992 |
| JP | 2001-142145 | 5/2001 |
| JP | 2002-196735 | 7/2002 |
| JP | 2002-207459 | 7/2002 |

* cited by examiner

*Primary Examiner*—Thuy Vinh Tran
(74) *Attorney, Agent, or Firm*—Scully, Scott, Murphy & Presser, P.C.

(57) ABSTRACT

A flicker detection system according to the present invention has an AC component extracting circuit that extracts an AC signal from a voltage applied to a lamp, the AC signal being an AC component of the voltage applied to the lamp, a display section adapted for displaying the information that flicker has occurred, and a control section that has a reference voltage registered in advance for determining that flicker has occurred and instructs the display section to display the information that flicker has occurred in the lamp, depending on the result of comparison between the reference voltage and the AC signal received from the AC component extracting circuit. In the present invention, when flicker occurs in a lamp, the voltage fluctuation generated between the lamp electrodes exceeds the reference voltage, and accordingly, the occurrence of flicker is determined by comparing the AC signal representative of the voltage fluctuation with the reference voltage, and when flicker occurs, a display to that effect is made.

5 Claims, 7 Drawing Sheets

FLICKER DETECTING SYSTEM FOR DETECTING LAMP LIFE DIFFERING FROM LAMP TO LAMP

BACKGROUND OF THE INVENTION

1. Field of the Invention

The present invention relates to a flicker detection system for an apparatus in which a lamp is used, such as a projector or the like, a method of detecting flicker, and a projector apparatus.

2. Description of the Related Art

It has been common to employ a discharge lamp such as a Xenon lamp etc. (hereinafter referred to simply as a lamp) having advantages of serving substantially as a point-source light and providing a high luminance for projector apparatuses such as a LCD (Liquid Crystal Display) projector, a DLP (Digital Lamp Processing) projector, etc. The luminance of a lamp ordinarily decreases with usage (operation time) causing the projected picture to become unclear. In order to address such an issue, Japanese Patent Laid-open Publication No, 2001-142145 describes measures to estimate in advance the usable life of a lamp, i.e., the time that elapses until the luminance is reduced causing the projection picture to become difficult to view, so that the lamp can be used for a maximum time.

In addition to the reduction of the luminance of a lamp, on the other hand, another cause that is responsible for disturbance in viewing the projection picture is the occurrence of flicker. Conventionally, manufacturers determined the life of a lamp based upon commonly performed tests to estimate reduced luminance and the occurrence of flicker to measure the approximate elapse of time until lamps would become unusable. Further, this information about the estimated life of a lamp was inputted into projector apparatuses as data which set the same limit on the usable time of individual lamps.

This above mentioned method to determine the usable life of a lamp was based upon the tendency of lamp in general and not on an individual lamp by lamp basis.

Furthermore, as a means to reduce the running cost a projector apparatus, there is a recent requirement on the part of users to continue using the lamp as long as the projection picture is reasonably clear, regardless of reduced luminance which results from long time use. A common practice in cinema theaters where films are shown is that lamps are replaced whenever there is an occurrence of flicker. As a result, the usable life of a lamp that has been inputted into the projector apparatus in advance as data is only regarded as a rough standard, and in fact the lamp is actually used until flicker occurs.

In the case of a Xenon lamp, on the other hand, the increase of flicker increases the risk that the lamp will burst. Consequently, any delay in replacing the lamp could cause the lamp burst within the projector apparatus. What is needed is a safe and reliable means to protect the projector apparatus from the bursting of a lamp in situations where the lamp is used until almost the expiration of the lamp.

SUMMARY OF THE INVENTION

It is an object of the present invention to provide a system and a method for detecting flicker that is capable of detecting an occurrence of flicker on a lamp-by-lamp basis and also to provide a projector apparatus using the system.

A flicker detection system according to the present invention is configured to comprise an AC component extracting circuit that extracts an AC signal from a voltage applied to the lamp, the AC signal being an AC component of the voltage applied to the lamp, a display section adapted for displaying the information that flicker has occurred in a lamp, and a control section that has a reference voltage registered in advance for determining an occurrence of flicker and instructs the display section to display the information that flicker has occurred in the lamp, depending on the result of comparison between the reference voltage and the AC signal received from the AC component extracting circuit.

The present invention is based on the fact that, when flicker occurs in a lamp, the voltage fluctuation generated between the lamp electrodes exceeds the reference voltage, and accordingly, an occurrence of flicker can be determined by comparing the AC signal representative of the voltage fluctuation with the reference voltage. In the present invention, when flicker occurs, a display to that effect is made. Hence the present invention enables notification that flicker has occurred to users of lamps in operation thereby allowing users to make full use of the lamp until the very moment that flicker occurs.

Further, in an apparatus that uses a lamp, such as a projector apparatus etc., the occurrence of flicker which is conventionally determined by human eye observation or through human senses, is quantitatively detected by measuring the fluctuation amplitude of voltage applied to a lamp.

Furthermore, in regard to the timing for replacing a lamp, conventionally, the lamp's life has been determined by estimates or guesses which ignore differences length of life among individual lamps. In the present invention, by contrast, since the flicker that occurs in a lamp is detected by a quantitative method, determination of the occurrence of flicker is freed from personal interpretations, and the actual life of every lamp can be shown.

Furthermore, since each lamp can be used substantially until it expires on its own, the period for replacing a lamp becomes longer than that of conventional systems, thereby reducing the running costs of a projector apparatus etc.

The above and other objects, features and advantages of the present invention will become apparent from the following description with reference to the accompanying drawings which illustrate examples of the present invention.

DETAILED DESCRIPTION OF THE PREFERRED EMBODIMENT

The flicker detection system of the present invention is provided with a circuit for monitoring periodic fluctuation of voltage applied to a lamp and enables quantitative detection of the occurrence of flicker by measuring the amplitude of the fluctuation in the voltage applied to the lamp.

(Embodiment 1)

Figure 1:
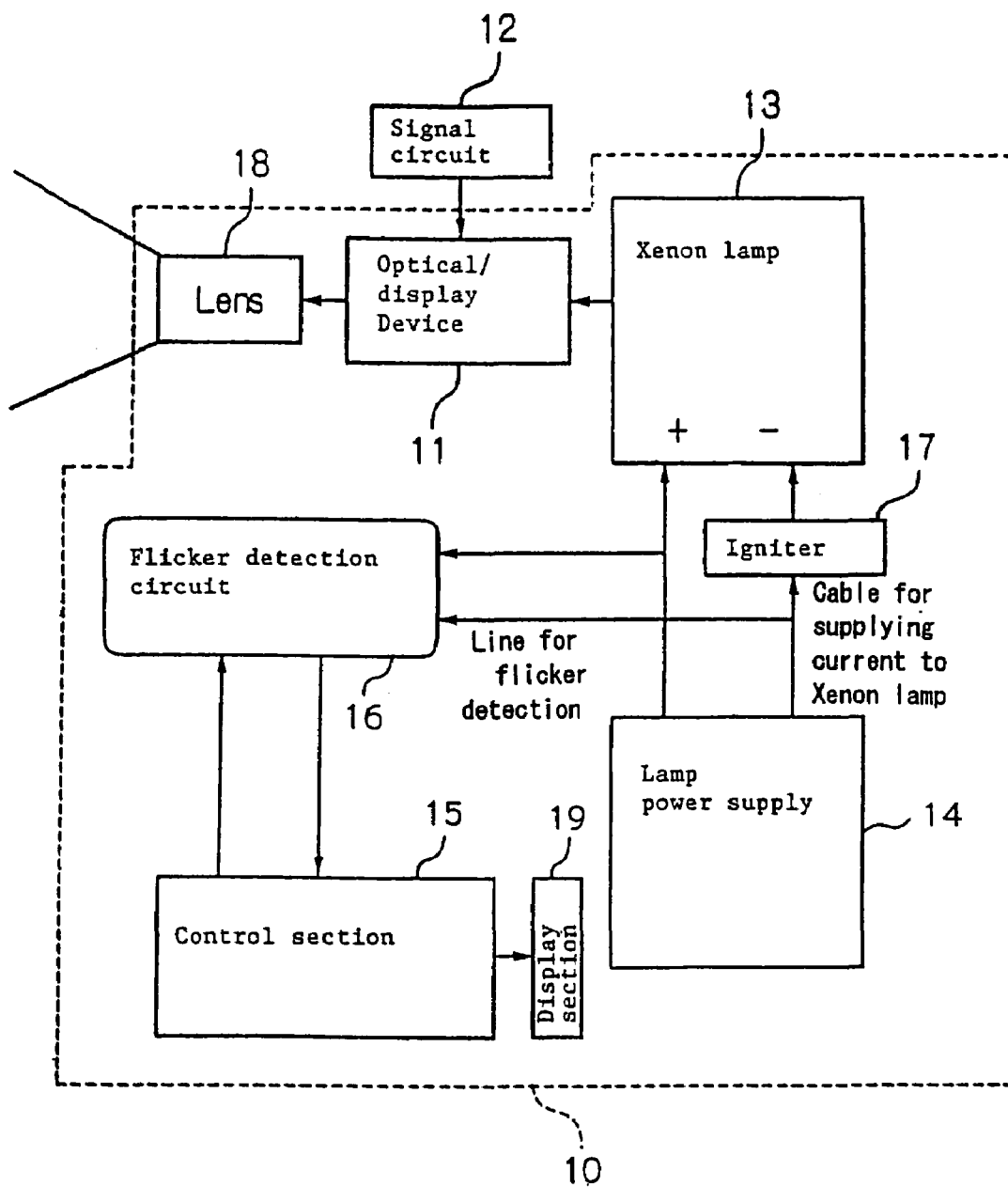
FIG. 1 is a block diagram illustrating an example of the construction of the projector apparatus according to the present invention.

As represented in FIG. 1, projector apparatus 10 is provided with:. Xenon lamp 13 for a light source; optical/display device 11 that appropriately collimates a light beam received from Xenon lamp 13, converts the image data, received from signal circuit 12 in an external device, to the images to be projected, and enters the images into projection lens 18; lamp power supply 14 that supplies a current to Xenon lamp 13; flicker detection circuit 16 that monitors the voltage applied to Xenon lamp 13; display section 19 that notifies the user of an occurrence of flicker; and control section 15 that controls the entire projector apparatus 10. Control section 15 is connected to and communicates with flicker detection circuit 16 and display section 19. Igniter 17 is a starter for Xenon lamp 13 to start discharge. Projection lens 18 enlarges the images received from optical/display device 11 and projects them onto a screen which is not shown.

Control section 15 is provided with a CPU (Central Processing Unit) for executing predetermined processes in accordance with programs and is also provided with a memory for storing the programs. A reference voltage for determining the occurrence of flicker is registered in advance in control section 15. Display section 19 is a device for notifying the user of the occurrence of flicker in order to prompt the user to replace the lamp. For example, it can be an LCD (Liquid Crystal Display) for displaying a message of an occurrence of flicker or a warning light to represent an occurrence of flicker through lighting.

Flicker detection circuit 16 monitors the voltage between the two lines for supplying a current from lamp power supply 14 to Xenon lamp 13 and provides a voltage amplitude of the AC (Alternating Current) component is read from the voltage applied to Xenon lamp 13, to control section 15.

Control section 15, when receiving the voltage amplitude from flicker detection circuit 16, compares it with the reference voltage for deciding on flicker, and if the voltage amplitude is higher than the reference voltage, then control section 15 controls display section 19 to display an occurrence of flicker.

Explanation is now given regarding the fundamental concept of the flicker detection by flicker detection circuit 16.

Lamp power supply 14 is provided with a current-supply control section (not shown) for performing control actions to supply a constant current to Xenon lamp 13 and supplies a constant current to Xenon lamp 13 through two cables connected to plus (+) and minus (−) electrodes. Xenon lamp 13 maintains lighting under supply of the constant current. However, while the voltage between the electrodes of Xenon lamp 13 is uniquely determined as a function of the structure of the lamp itself, the current intensity and the temperature, etc., the voltage varies depending on the state of arc discharge and thus is not always strictly a constant DC (Direct Current) voltage.

Figure 2:
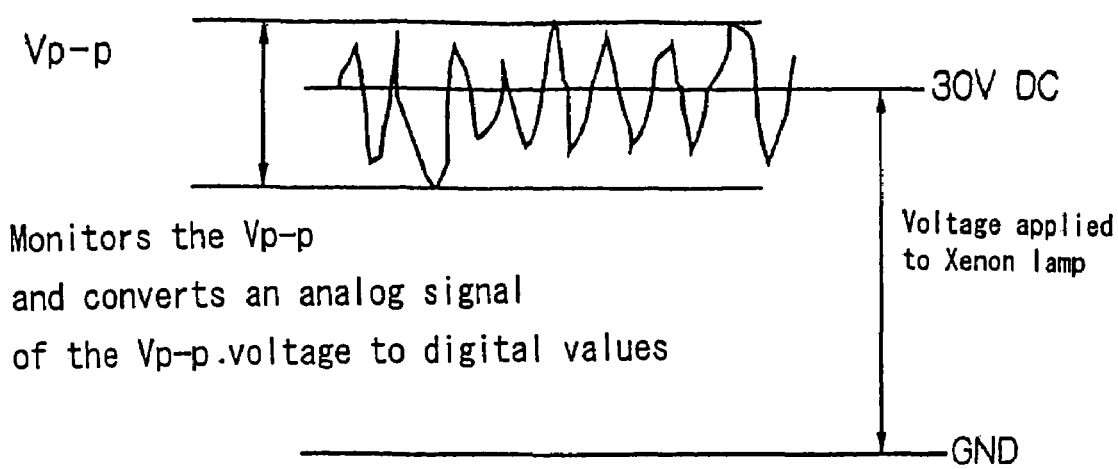
FIG. 2 is a graph representing a voltage between the electrodes of a Xenon lamp.

FIG. 2 is a graph representing a voltage between the electrodes of the Xenon lamp. As shown in FIG. 2, for example, when a voltage of 30V DC is applied to a lamp, "a rampage voltage" including an AC component that has a peak-to-peak voltage Vp-p is caused by an arc discharge state within the lamp. While this "rampage voltage" is as high as about 1 to 2 V in FIG. 2, it grows higher as the lamp approaches expiration, and when the Vp-p exceeds a predetermined value, flicker is caused in the lamp. For this reason, an occurrence of flicker can be detected by monitoring the Vp-p and deciding whether or not the Vp-p exceeds the predetermined value. For reference, the predetermined value is assigned to the reference voltage for deciding the occurrence of flicker.

Figure 3:
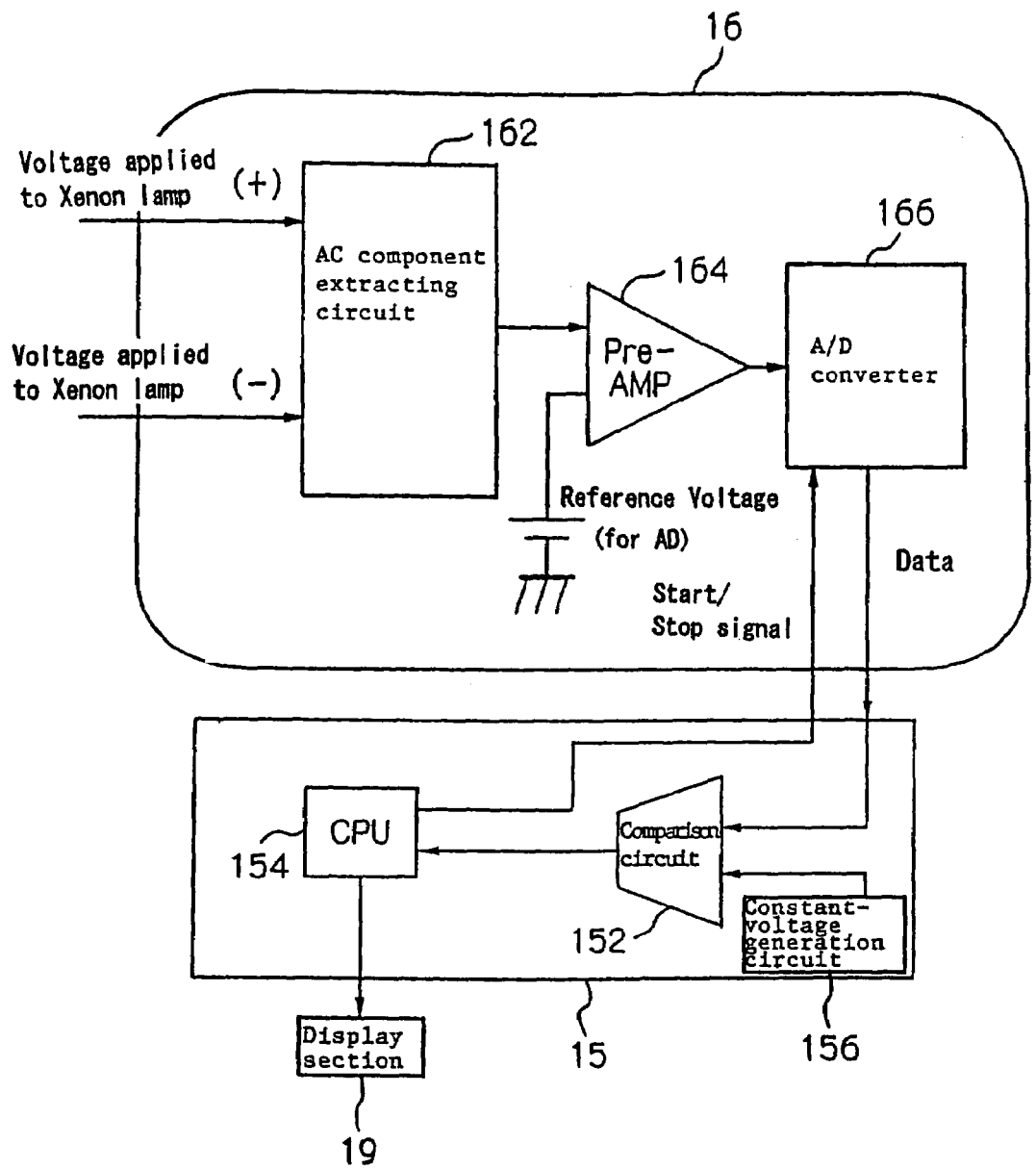
FIG. 3 is a block diagram illustrating an example of the construction of the flicker detection system according to the present invention.

Explanation is next presented in detail regarding the flicker detection system. FIG. 3 is a circuit diagram illustrating an example of the construction of the flicker detection system.

As shown in FIG. 3, the flicker detection system is configured to have flicker detection circuit 16, control section 15 and display section 19. Flicker detection circuit 16 is provided with: a circuit 162 (hereinafter referred to as an "AC component extracting circuit" 162) that extracts an AC component from the voltage applied to Xenon lamp 13; preamplifier 164 that amplifies the signal received from AC component extracting circuit 162 to make signal-processing; and A/D (Analog/Digital) converter 166 for digitizing the signal received from preamplifier 164. Control section 15 has comparison circuit 152 for determining an occurrence of flicker. One of the two input terminals for supplying signals to comparison circuit 152 is connected to A/D converter 166 and the other is connected to constant-voltage generation circuit 156 for providing the reference voltage. This constant-voltage generation circuit 156 is provided with a variable resistor and adjusting the variable resistor provides the desired reference voltage, which is registered in advance.

AC component extracting circuit 162 has a capacitor coupling circuit provided with a capacitor connected to power transmission lines that carries a voltage to be applied between the electrodes, in order to extract an AC signal, which represents the AC component, from the voltage between the electrodes of Xenon lamp 13. The capacitor coupling circuit is also configured to be adaptable to a long period of flicker by making it possible for the circuit to extract a flicker of as low a frequency as possible when extracting the AC signal. In addition, while the subject embodiment employs a capacitor coupling circuit, it is possible to employ a DC compensation circuit such as a differential amplifier etc. in place of the capacitor coupling circuit.

A/D converter 166 converts the AC signal received from preamplifier 164 to AC digital signals, which are the digitized signals of the AC signal, and provides the converted digital signals to comparison circuit 152.

Comparison circuit 152 compares the voltage amplitude indicated by the AC digital signal received from A/D converter 166 and the magnitude of the reference voltage stored in advance, and if the voltage amplitude is higher than the reference voltage, then comparison circuit 152 provides a flicker detection signal to CPU 154 in control section 15, which is a signal representative of an occurrence of flicker in the lamp. CPU 154, when receiving the flicker detection signal from A/D converter 166, controls display section 19 to display a message to notify an occurrence of flicker.

The subject flicker detection system, by making use of the above-described construction, enables comparing the AC signal, which indicates a fluctuation of the voltage applied between electrodes of the lamp, with the reference voltage and further, based on the comparison result, deciding whether or not flicker occurs, because when flicker occurs in a lamp, the fluctuation of the voltage applied between electrodes of the lamp exceeds the reference voltage. Furthermore, when flicker occurs, the occurrence of flicker is displayed.

In addition, when lamp power supply 14 is turned on, CPU 154 sends a start signal to A/D converter 166 for operating A/D converter 166. But, when lamp power supply 14 is turned off, CPU 154 sends a stop signal to A/D converter 166 for stopping the operation of A/D converter 166.

Figure 4:
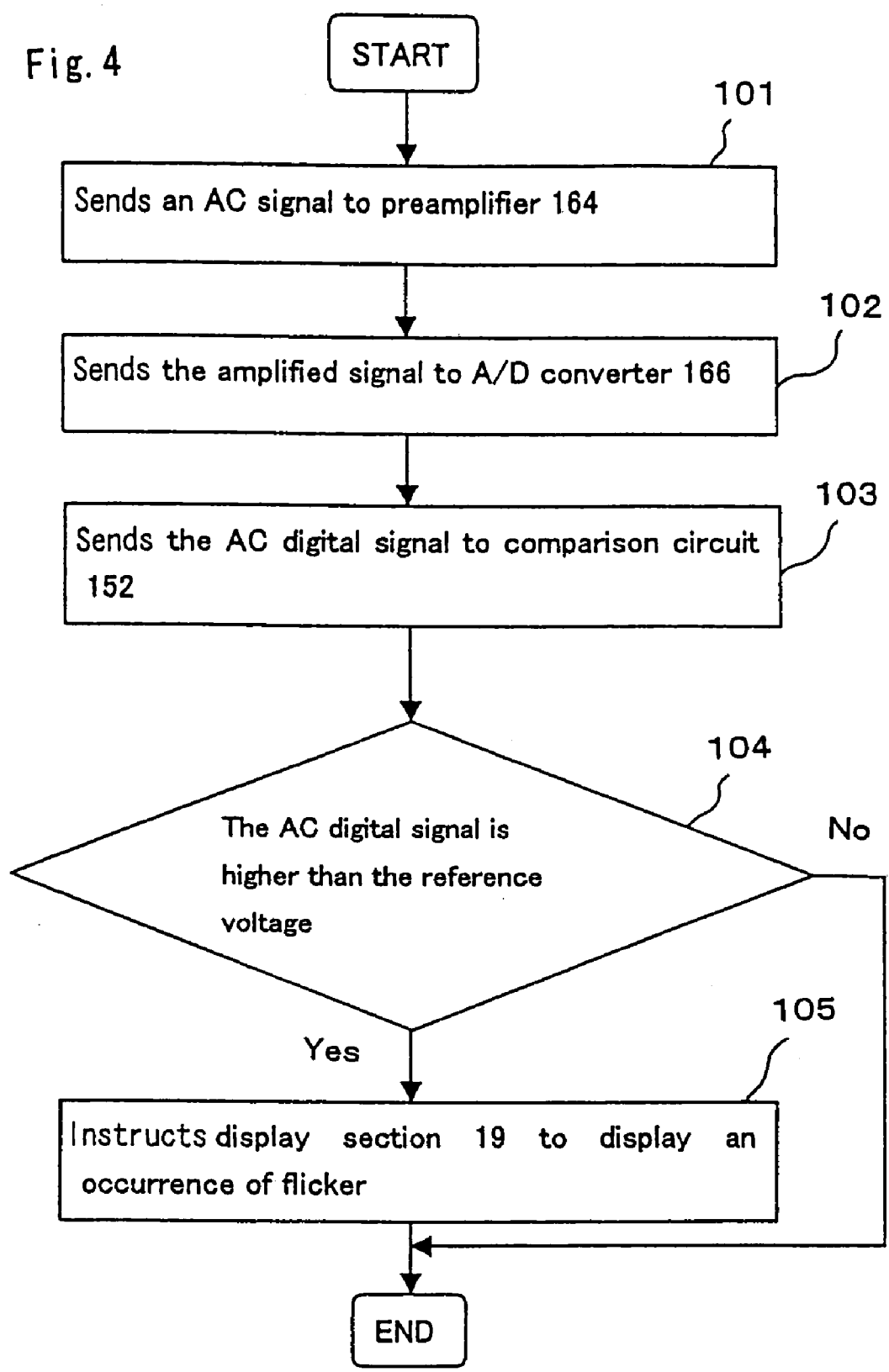
FIG. 4 is a flow chart illustrating the operation process of the flicker detection system.

Explanation next regards the operation procedures of the flicker detection system having the above-described construction. FIG. 4 is a flow chart representing the operation procedures of the flicker detection system.

When the user turns on the power of projector apparatus 10 and switches lamp power supply 14 on, igniter 17 signals Xenon lamp 13 to start discharging, a constant current begins flowing in Xenon lamp 13 and A/D converter 166 starts operation. When AC component extracting circuit 162 receives a voltage having an AC+DC (superposition of AC and DC components) waveform through the two lines connected from lamp power supply 14 to Xenon lamp 13, AC component extracting circuit 162 extracts the AC component by the capacitor coupling circuit and sends the extracted component to preamplifier 164 as an AC signal (Step 101).

Next, on receiving the AC signal from AC component extracting circuit 162, preamplifier 164 amplifies the AC signal and sends the amplified signal to A/D converter 166 (Step 102). On receiving the AC signal supplied from preamplifier 164, A/D converter 166 converts the AC signal to the AC digital signal and sends the converted result to comparison circuit 152 (Step 103).

Comparison circuit 152 decides whether or not the voltage amplitude, indicated by the AC digital signal received from A/D converter 166, is higher than the reference voltage (Step 104), and if the voltage amplitude is higher than the reference voltage, then the comparison circuit 152 sends a flicker detection signal to CPU 154. CPU 154, on receiving the flicker detection signal from comparison circuit 152, instructs display section 19 to display the information that flicker has occurred in order to notify to the user that it is necessary to replace the lamp (Step 105). Alternatively, if the voltage amplitude is lower than the reference voltage in Step 104, then the comparison circuit 152 does not send a flicker detection signal to CPU 154.

As described above, flicker occurs severely near the expiration of the lamp. The present invention therefore monitors the voltage applied to the lamp to detect "a rampage voltage", compares the "rampage voltage" with a reference voltage registered in advance, and defines an occurrence of flicker by the voltage amplitude that exceeds the reference voltage, whereby flicker is detected quantitatively. Lamp life can be determined for all lamps by detecting an occurrence of flicker as described above. Since users of all lamps will be notified about the occurrence of flicker, they can continue to use the lamp for the lamps's entire life, in accordance with the life of each individual lamp.

Furthermore, since the present flicker detection system allows every lamp to be used substantially until the end of the lamp life, this enables reduction of the running cost of a projector apparatus. Furthermore, since an occurrence of flicker is notified to the user, the user can replace the lamp that generates flicker with a new lamp before the lamp bursts.

(Embodiment 2)

In addition to the structure of embodiment 1, the present embodiment provides a structure for monitoring the luminescence intensity of a lamp to improve the reliability of flicker detection.

Explanation is given in regard to the construction of the subject embodiment. For reference, constituent elements that are identical to constituent elements in embodiment 1 have the same symbols, and detailed explanation of the structures and operations of these elements is omitted here.

Figure 5:
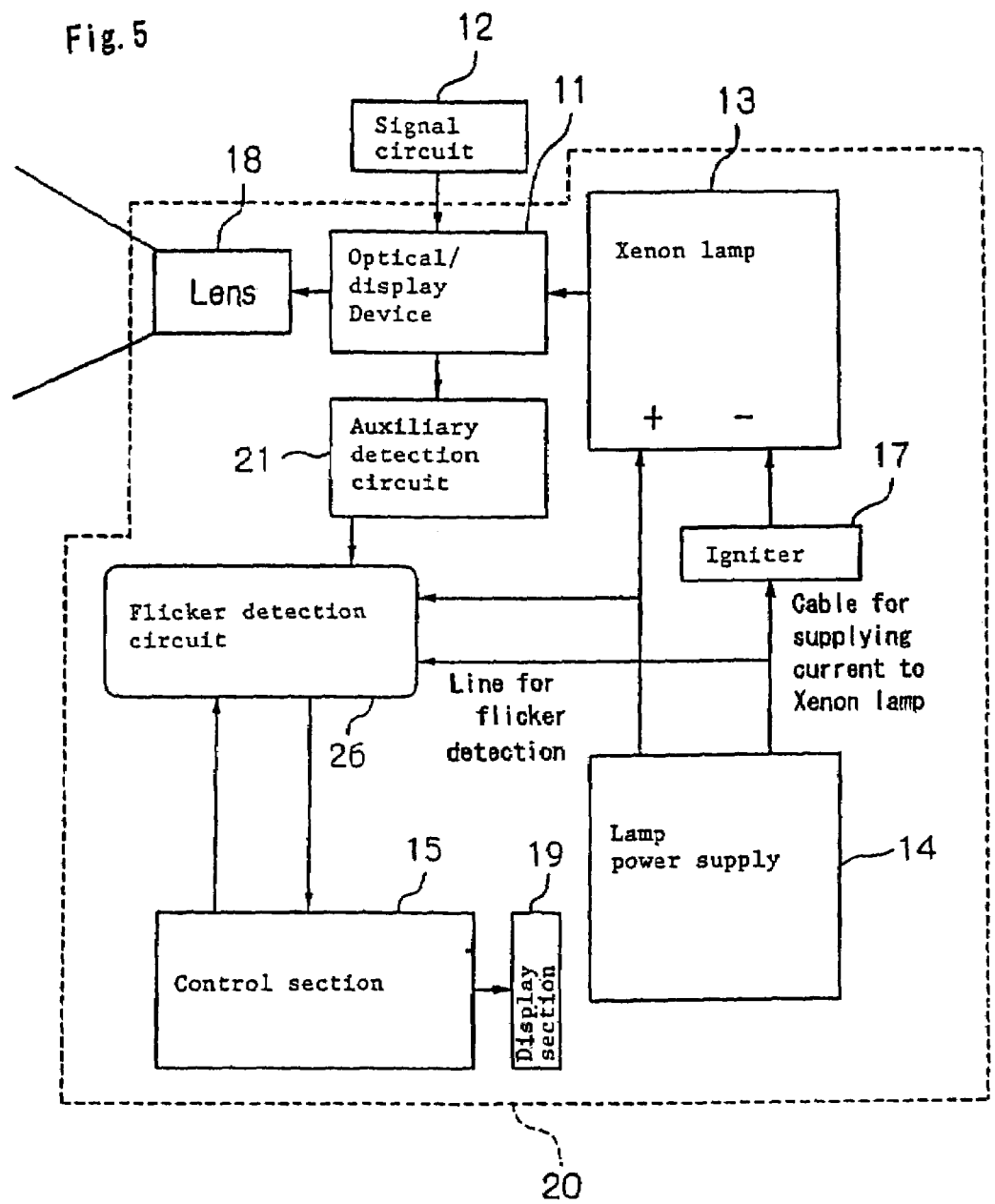
FIG. 5 is a block diagram illustrating an example of the construction of the projector apparatus of Embodiment 2.

FIG. 5 is a block diagram representing the projector apparatus of the present embodiment. In addition to the structure shown in FIG. 1, as shown in FIG. 5, projector apparatus 20 is provided with auxiliary detection circuit 21 that is connected between optical/display device 11 and flicker detection circuit 26 to enhance the reliability of flicker detection.

Figure 6:
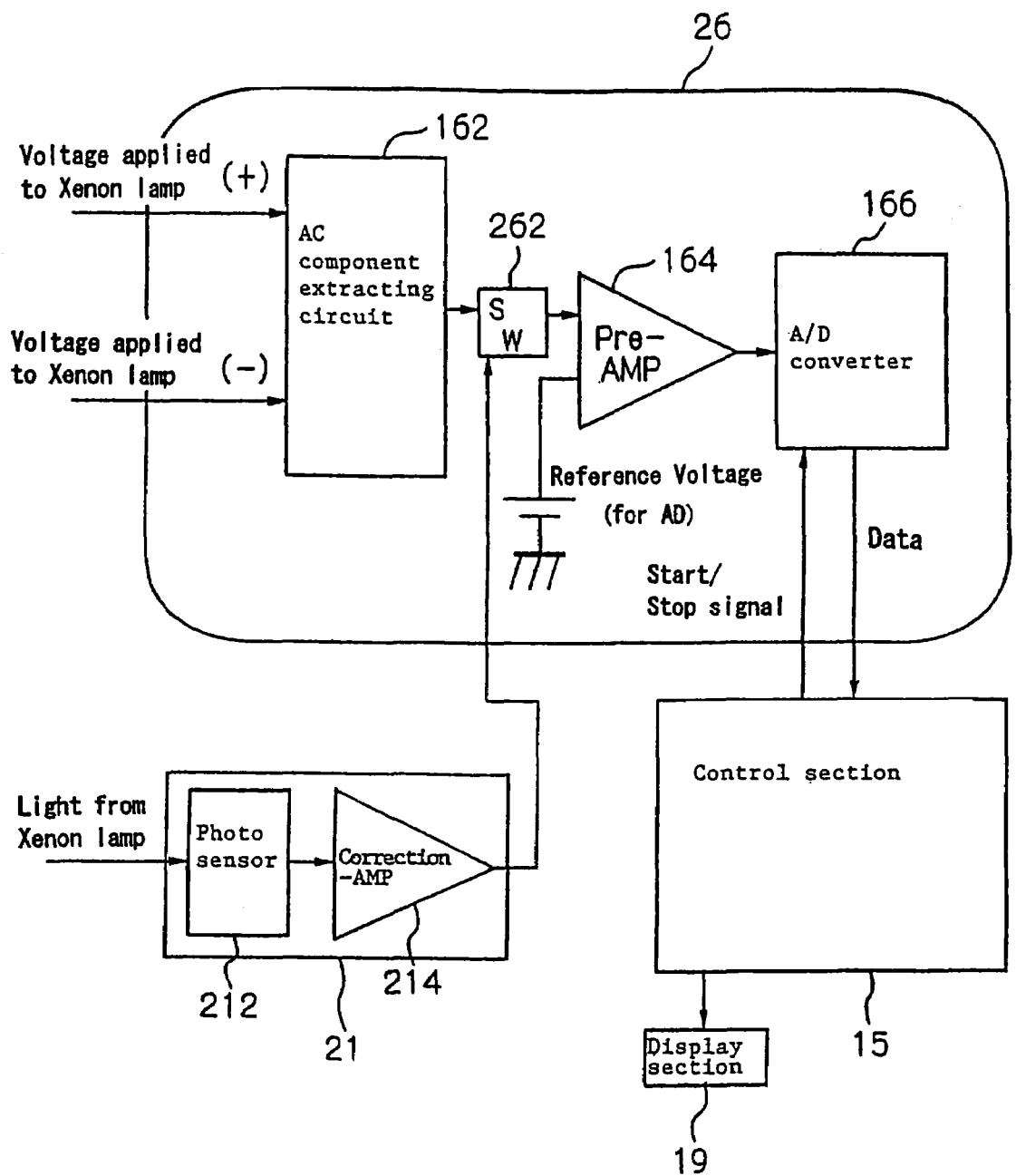
FIG. 6 is a block diagram illustrating an example of the construction of the flicker detection system of Embodiment 2.

FIG. 6 is a block diagram representing an example of the construction of the flicker detection system of the subject embodiment. As shown in FIG. 6, flicker detection circuit 26 is provided with switch (SW) 262 in the signal transmission line for transmitting the AC signal provided from AC component extracting circuit 162 to preamplifier 164. Auxiliary detection circuit 21 for converting the luminescence intensity of a lamp into an electrical signal is connected to switch 262, wherein the electrical signal is a signal representing the luminescence intensity of a lamp in terms of the value of voltage. In the following description, this electrical signal is called an "optical intensity signal". Auxiliary detection circuit 21 is provided with photo sensor 212 and correction amplifier 214, photo sensor 212 being an optical detection device that converts the luminescence intensity of Xenon lamp 13 into an optical intensity signal, and correction amplifier 214 being adapted for extracting an AC component from the optical intensity signal received from photo sensor 212 to provide an AC signal and for amplifying the AC signal for signal processing.

When photo sensor 212 sends an optical intensity signal to correction amplifier 214, correction amplifier 214 extracts an AC component from the optical intensity signal received from photo sensor 212. This AC component is intended to be added to the AC signal that is provided from AC component extracting circuit 162. The AC component of the optical intensity signal is hereinafter referred to as an AC auxiliary signal. Correction amplifier 214 sends the AC auxiliary signal to switch 262 in flicker detection circuit 26. Switch 262 adds the AC auxiliary signal received from auxiliary detection circuit 21 to the AC signal. For reference, if the lamp is substantially free of periodic fluctuation in luminance, then photo sensor 212 does not extract any AC component from the optical intensity signal. Thus, auxiliary detection circuit 21 sends no signal to flicker detection circuit 26.

For example, a case may be envisioned in which auxiliary detection circuit 21 is used for a DMD (Digital Micromirror Device). In this case, if photo sensor 212 is arranged so that it can be illuminated with unutilized light, i.e., light that does not come out of the lens of the DMD, (hereinafter referred to as an OFF light), photo sensor 212 supplies an optical intensity signal to correction amplifier 214 when the OFF light generates a periodic fluctuation in the illuminance.

Explanation next regards the operation of the flicker detection circuit. In this explanation, it is assumed that flicker occurs in Xenon lamp 13 and also that the luminance of the Xenon lamp 13 periodically varies.

Photo sensor 212 converts the luminance intensity into an optical intensity signal and further extracts an AC auxiliary signal from the optical intensity signal. Photo sensor 212 supplies the AC auxiliary signal to correction amplifier 214. Correction amplifier 214, on receiving an AC auxiliary signal, amplifies the AC auxiliary signal in synchronization with the signal processing of flicker detection circuit 26 and sends the amplified signal to switch 262. Switch 262, on receiving an AC auxiliary signal from correction amplifier 214, adds the AC auxiliary signal to the AC signal sent from AC component extracting circuit 162. The procedures are thereafter performed according to the method shown in FIG. 4.

In the present embodiment, when flicker occurs in a lamp, the luminescence intensity of the lamp varies periodically and the periodic fluctuation in the lamp luminance is detected as an AC auxiliary signal. Accordingly, addition of the AC auxiliary signal to the AC signal allows the actual luminescence intensity of a lamp to be reflected into the AC signal and allows flicker to be detected through both the voltage applied to the lamp and the actual luminescence intensity, thereby improving the detection reliability of flicker.

Figure 7:
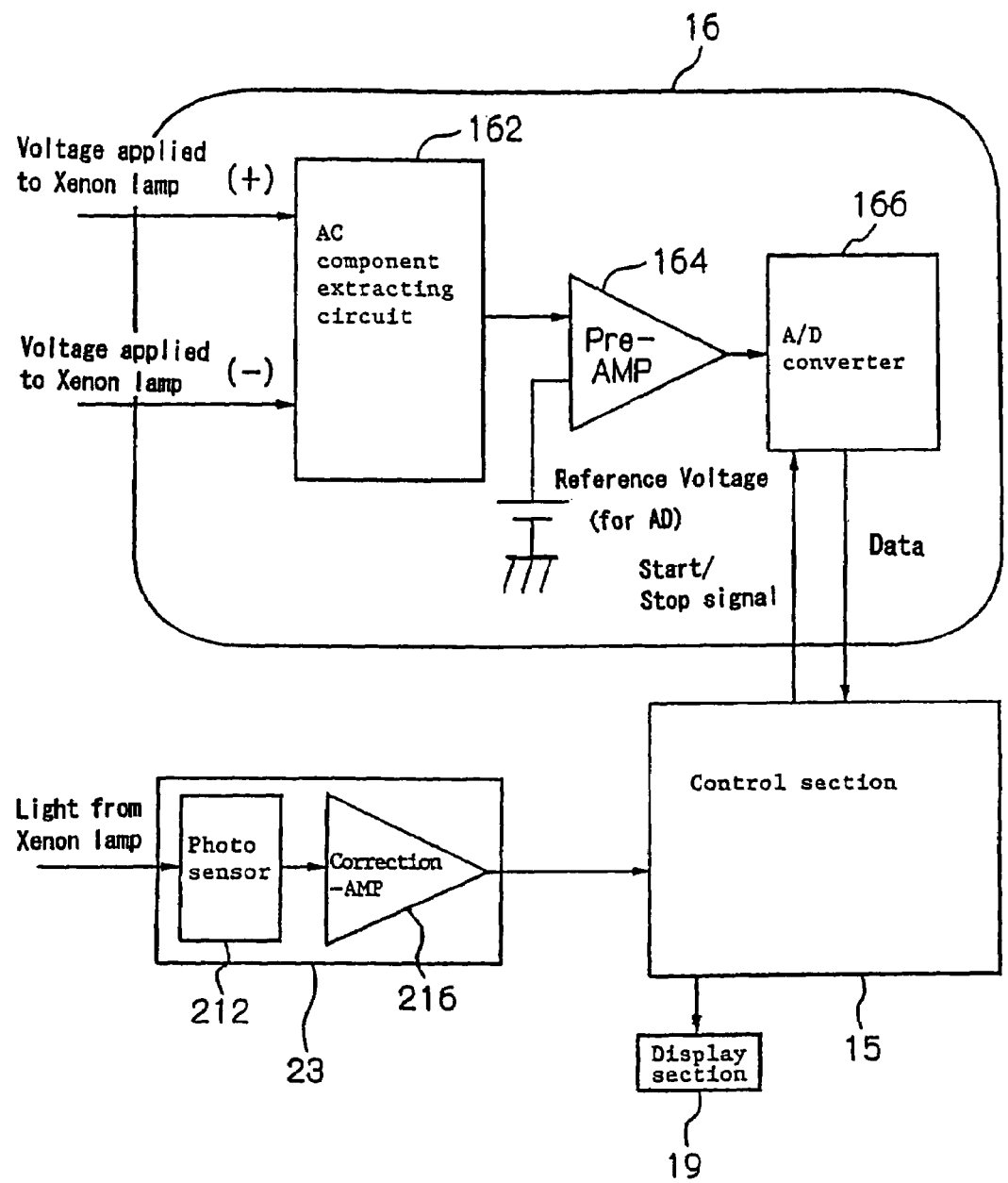
FIG. 7 is a block diagram illustrating another example of Embodiment 2.

Auxiliary detection circuit 21 for extracting an AC auxiliary signal from the optical intensity signal is hereinafter referred to as a first auxiliary detection circuit. For reference, it is recommended that a second auxiliary detection circuit is provided for extracting a DC auxiliary signal from an optical intensity signal, wherein the DC auxiliary signal represents a signal representing a DC component corresponding to an absolute luminance. FIG. 7 is a block diagram illustrating an embodiment in which the second auxiliary detection circuit is provided.

The second auxiliary detection circuit 23 is provided with photo sensor 212 and correction amplifier 216 that extracts a DC auxiliary signal from an optical intensity signal received from photo sensor 212 and sends the extracted signal to control section 15. In this case, the memory in CPU 154 arranged in control section 15, represented in FIG. 3, stores in advance the reference intensity data that represents the minimum necessary luminescence intensity for permitting use of a lamp to decide whether or not the luminescence intensity is sufficient. CPU 154 compares the magnitude of the DC auxiliary signal received from second auxiliary detection circuit 23 with the reference intensity data and decides that the lamp has expired if the DC auxiliary signal has a lower level than the reference intensity data and if the voltage amplitude of the AC signal is higher than the reference voltage. When CPU 154 decides that the lamp has expired, it instructs display section 19 to display the information that flicker has occurred, in order to prompt the user to replace the lamp. The reference intensity data can indicate a half value of the initial luminance of the lamp.

Providing the second auxiliary detection circuit makes it possible to detect that the luminescence intensity of a lamp becomes lower than the minimum necessary luminance, and the lamp luminance can also be quantitatively detected. In this way, the life of a lamp is determined by both the luminance and the flicker, and an occurrence of flicker is notified to the user. Consequently, the user can learn of the expiration of the lamp based on both the flicker and the luminance.

Further, it is possible to provide both the first and second auxiliary detection circuits. In this case, the life of a lamp can be determined more reliably.

While the above-described first and second embodiments describe the case of amplifying the AC signal and then converting the amplified signal into a digital signal, it is also permissible that control section 15 directly receives the AC signal.

Furthermore, while comparison circuit 152 is employed for flicker determination in the above embodiments, it is also allowable that CPU 154 compares the voltage amplitude of the AC digital signal received from A/D converter 166 with the reference voltage and executes the process of flicker determination in accordance with a program. In this case, the reference voltage is stored in advance in memory.

In addition, while the forgoing description describes the flicker determination when Xenon lamp 13 is employed, another lamp such as an ultrahigh-pressure mercury lamp can also be employed.

While preferred embodiments of the present invention have been described using specific terms, such description is for illustrative purposes only, and it is to be understood that changes and variations may be made without departing from the spirit or scope of the following claims.

What is claimed is:

1. A flicker detection system for detecting flicker that occurs in a lamp, comprising
   an AC component extracting circuit that extracts an AC signal from a voltage applied to said lamp, said AC signal being an AC component of said voltage applied to said lamp,
   an auxiliary detection circuit that coverts a luminescence intensity of said lamp to a voltage value and adds an AC auxiliary signal to said AC signal, the AC auxiliary signal being a signal representative of an AC component of said value of voltage,
   a display section adapted for displaying information that flicker has occurred in said lamp, and
   a control section that has a reference voltage registered in advance for determining an occurrence of flicker and instructs said display section to display the information that flicker has occurred in said lamp, depending on a result of comparison between said reference voltage and said AC signal received from said AC component extracting circuit.

2. A flicker detection system according to claim 1, wherein said control section is provided with a comparison circuit for determining whether or not a voltage amplitude of said AC signal is high in comparison with said reference voltage.

3. A flicker detection system according to claim 1, further provided with a second auxiliary detection circuit that converts a luminescence intensity of said lamp to a voltage value and sends a DC auxiliary signal, which is a signal representative of a DC component of said voltage value, to said control section, wherein
   said control section has reference intensity data registered in advance, compares said DC auxiliary signal, received from said second auxiliary detection circuit, with said reference intensity data, and instructs said display section to display the information that flicker has occurred in said lamp if said DC auxiliary signal has a level lower than said reference intensity data and also if a voltage amplitude of said AC signal is higher than said reference voltage.

4. A projector apparatus comprising:
   an AC component extracting circuit that extracts an AC signal from a voltage applied to a lamp, said AC signal being an AC component of said voltage applied to said lamp,
   an auxiliary detection circuit that coverts a luminescence intensity of said lamp to a voltage value and adds an AC auxiliary signal to said AC signal, the AC auxiliary signal being a signal representative of an AC component of said value of voltage, a display section adapted for displaying information that flicker has occurred in said lamp, and a control section that has a reference voltage registered in advance for determining an occurrence of flicker and instructs said display section to display the information that flicker has occurred in said lamp, depending on a result of comparison between said reference voltage and said AC signal received from said AC component extracting circuit.

5. A method of detecting flicker through a use of a flicker detection system having a display section, comprising:

registering a reference voltage for determining on flicker, extracting an AC signal that is a signal representing an AC component of a voltage applied to a lamp, converting a luminescence intensity of said lamp to a voltage value and adding an AC auxiliary signal to said AC signal, said AC auxiliary signal representative of an AC component of said value of voltage, and instructing said display section to display an information that flicker has occurred in said lamp, depending on a result of comparison of said AC signal with said reference voltage.

* * * * *